(12) United States Patent
Bailey et al.

(10) Patent No.: US 10,087,406 B2
(45) Date of Patent: Oct. 2, 2018

(54) ALCOHOLIC BEVERAGE ENHANCING DEVICE

(71) Applicant: Terressentia Corporation, Ladson, SC (US)

(72) Inventors: Edward W. Bailey, Johns Island, SC (US); Norma Lindsay, North Charleston, SC (US)

(73) Assignee: Terressentia Corporation, Ladson, SC (US)

( * ) Notice: Subject to any disclaimer, the term of this patent is extended or adjusted under 35 U.S.C. 154(b) by 159 days.

(21) Appl. No.: 15/156,522

(22) Filed: May 17, 2016

(65) Prior Publication Data
US 2017/0335264 A1 Nov. 23, 2017

(51) Int. Cl.
*C12H 1/22* (2006.01)
*C12H 1/06* (2006.01)
*C12H 1/16* (2006.01)

(52) U.S. Cl.
CPC ............... *C12H 1/165* (2013.01); *C12H 1/06* (2013.01); *C12H 1/22* (2013.01)

(58) Field of Classification Search
CPC ............. C12G 1/062; C12H 1/22; C12H 1/06
USPC ............................................... 99/277.1, 277.2
See application file for complete search history.

(56) References Cited

U.S. PATENT DOCUMENTS

| 2,088,585 | A | 8/1937 | Chambers et al. |
| 4,210,676 | A | 7/1980 | Dudar et al. |
| 5,173,318 | A * | 12/1992 | Leu .......................... C12H 1/12 426/238 |
| 6,877,551 | B2 | 4/2005 | Stoller |
| 7,063,867 | B2 | 6/2006 | Tyler, III et al. |
| 7,334,516 | B2 * | 2/2008 | Ho .......................... C12H 1/16 366/144 |
| 7,949,143 | B2 | 5/2011 | Sekino et al. |
| 2005/0183739 | A1 | 8/2005 | McDermott et al. |
| 2005/0229674 | A1 | 10/2005 | Smith et al. |
| 2010/0062120 | A1 * | 3/2010 | Jang .......................... C12H 1/16 426/234 |

(Continued)

FOREIGN PATENT DOCUMENTS

| EP | 860498 A1 | 8/1998 |
| WO | 0011135 A1 | 3/2000 |

(Continued)

OTHER PUBLICATIONS

Preston et al., "Accelerated Aging Technology", http://widowjane.com/resources/, retrieved on Oct. 16, 2015, 49 pages.

(Continued)

*Primary Examiner* — Reginald L Alexander
(74) *Attorney, Agent, or Firm* — Dority & Manning, P.A.

(57) ABSTRACT

An alcoholic beverage enhancing device includes a transfer liquid tank for holding a transfer liquid and an alcoholic beverage container. The alcoholic beverage container is positioned at least partially in the transfer liquid tank and is configured for holding an alcoholic beverage to be enhanced. The enhancing device additionally includes an ultrasonic energy device positioned for transmitting ultrasonic energy to the alcoholic beverage in the alcoholic beverage container through the transfer liquid in the transfer liquid tank during operation of the alcohol beverage enhancing device.

18 Claims, 4 Drawing Sheets

(56) References Cited

U.S. PATENT DOCUMENTS

2011/0070331 A1* 3/2011 Watson .................. C12G 3/065
                                                         426/15
2012/0318697 A1   12/2012 Stern
2016/0129407 A1    5/2016 Wrosch et al.

FOREIGN PATENT DOCUMENTS

WO      2013019125 A2    2/2013
WO      2013019125 A3    5/2014

OTHER PUBLICATIONS

International Search Report, dated Aug. 3, 2017.

* cited by examiner

ALCOHOLIC BEVERAGE ENHANCING DEVICE

FIELD OF THE INVENTION

The present subject matter relates generally to a device for maturing, refining, filtering, or otherwise enhancing an alcoholic beverage.

BACKGROUND OF THE INVENTION

Alcoholic beverages, such as vodka, tequila, rum, bourbon, scotch, brandy and the like are generally produced through a distillation process. Once produced, in order to improve the taste and smoothness of the beverage, many products are aged. For instance, bourbons and scotches are typically aged at least three years prior to being sold for consumption. Rums, tequilas and brandies are aged for varying amounts from two to ten years or even more.

In the past, alcoholic beverages, such as bourbon and scotch, for example, have been aged in oak barrels or casks over long periods of time. The beverages are aged in the wooden containers in order to remove unwanted components and to impart certain colors, flavors and fragrances to enhance the smoothness and taste of the beverage. During the aging process, the distillates can react with components in the wood, such as lignins, tannins, and carbohydrates. Distillation and aging techniques have changed little over the last several hundred years.

Unfortunately, the costs of conventional aging processes are enormous, often accounting for half to two-thirds or even more of the cost of the spirit to consumers. For instance, to ensure product quality, the oak barrels should be stored in warehouses under carefully controlled temperature and humidity conditions for very long periods of time. The barrels are not only very expensive to manufacture but also take up a significant amount of space. Further, much of the alcoholic product can be lost during aging due to evaporation through the pores of the barrels.

In addition, natural barrel aging also presents limitations to the chemical reactions which are believed to improve spirit flavor and quality. For instance, oxidation and esterification reactions which are believed to assure spirit smoothness and flavor tend to be inefficient and unable to proceed to completeness at the temperatures which are preferred for limiting loss of product due to evaporation. Thus a balance must be struck with aging processes between increased temperature in order to promote desired chemical reactions and lower temperature desired to limit product evaporation.

Certain processes for rapidly enhancing alcoholic beverages have been developed that involve subjecting the alcoholic beverages to ultrasonic energy. For example, U.S. Pat. No. 7,063,867 to Tyler, III et al., which is incorporated herein by reference as to all relevant matters, is directed to a process for enhancing alcoholic beverages including subjecting the alcoholic beverages to a disclosed amount of ultrasonic energy. However, previous devices configured for utilizing such a rapid enhancing process for alcoholic beverages have been designed for large batch operations. The inventors of the present disclosure have discovered that it may be beneficial to have the capability of utilizing such processes for rapidly enhancing alcohol at various locations to, e.g., display the capability of these processes. Accordingly, a device for enhancing alcoholic beverages that may be transferred to one or more various locations would be beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an alcoholic beverage enhancing device is provided. The alcoholic beverage enhancing device includes a transfer liquid tank for holding a transfer liquid, and an alcoholic beverage container positioned at least partially in the transfer liquid tank. The alcoholic beverage container is configured for holding an alcoholic beverage to be enhanced. The alcoholic beverage enhancing device additionally includes an ultrasonic energy device positioned for transmitting ultrasonic energy to the alcoholic beverage in the alcoholic beverage container through the transfer liquid during operation of the alcoholic beverage enhancing device.

In another exemplary embodiment of the present disclosure, an alcoholic beverage enhancing device is provided. The alcoholic beverage enhancing device includes a transfer liquid tank containing a transfer liquid, and an alcoholic beverage container positioned at least partially in the transfer liquid tank and directly exposed to the transfer liquid. The alcoholic beverage container holds an alcoholic beverage. The alcoholic beverage enhancing device additionally includes an ultrasonic energy device positioned within or adjacent to the transfer liquid tank for transmitting ultrasonic energy through the transfer liquid in the transfer liquid tank to the alcoholic beverage in the alcoholic beverage container during operation of the alcoholic beverage enhancing device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Figure 1:
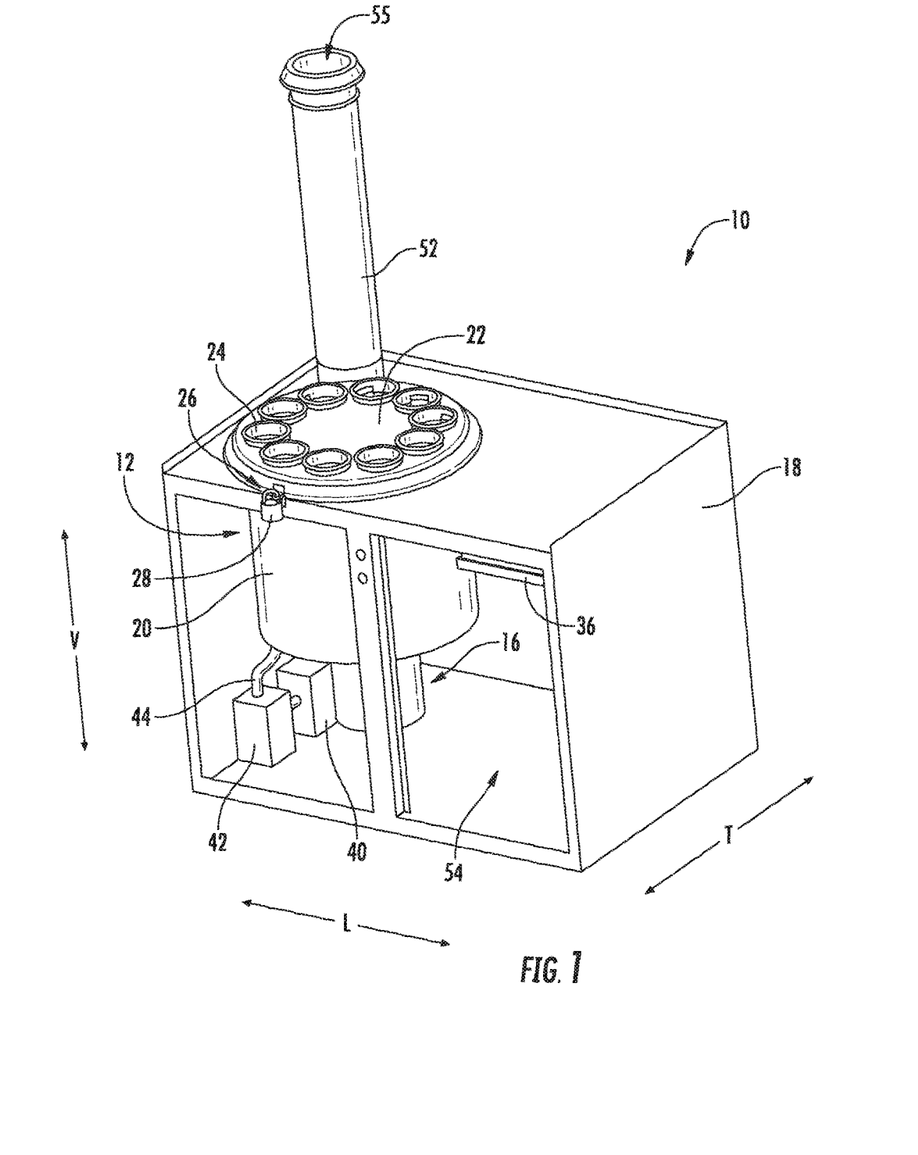
FIG. 1 is a perspective view of an alcoholic beverage enhancing device in accordance with an exemplary embodiment of the present disclosure.
Figure 2:
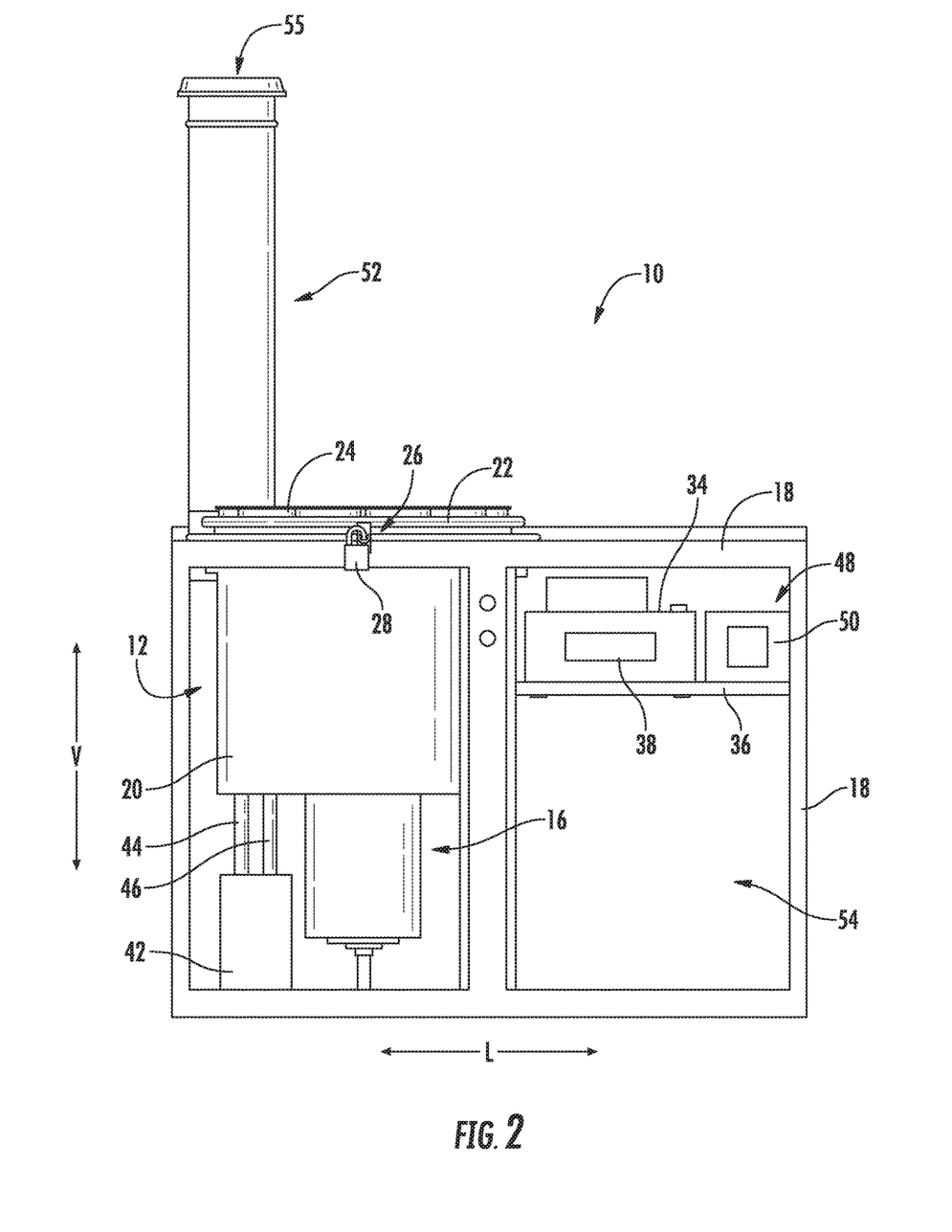
FIG. 2 is a front view of the exemplary alcoholic beverage enhancing device of FIG. 1.
Figure 3:
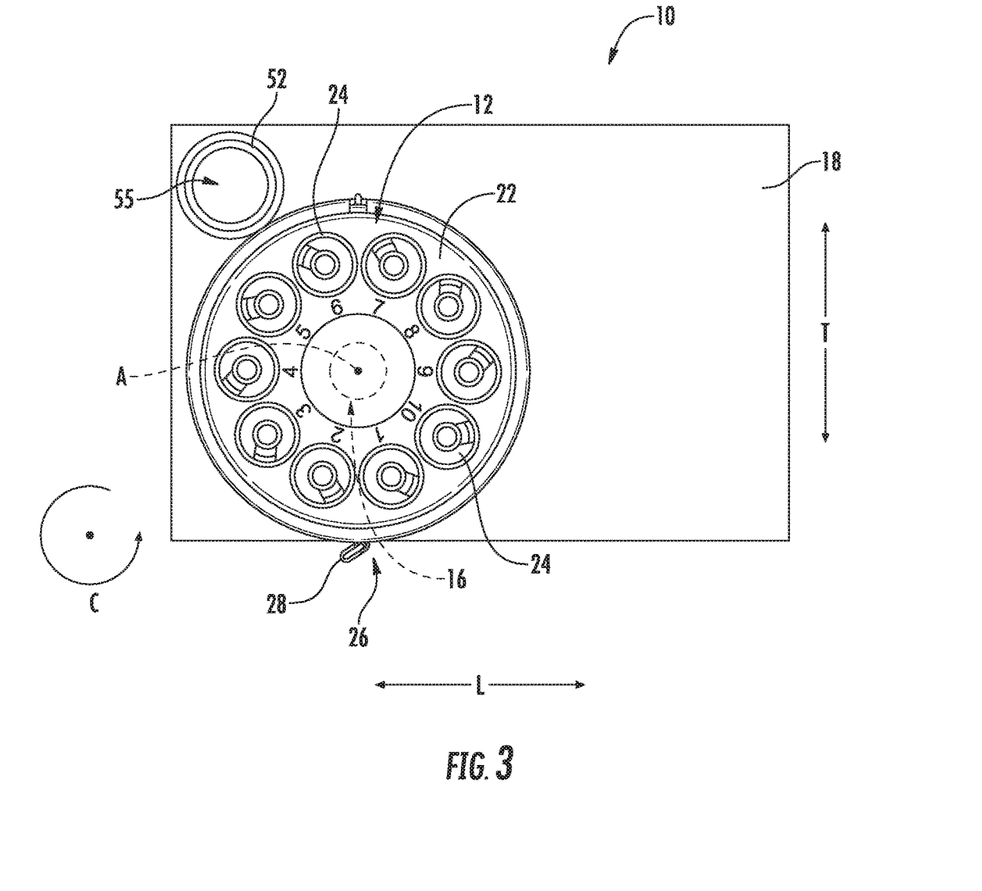
FIG. 3 is a top view of the exemplary alcoholic beverage enhancing device of FIG. 1.
Figure 4:
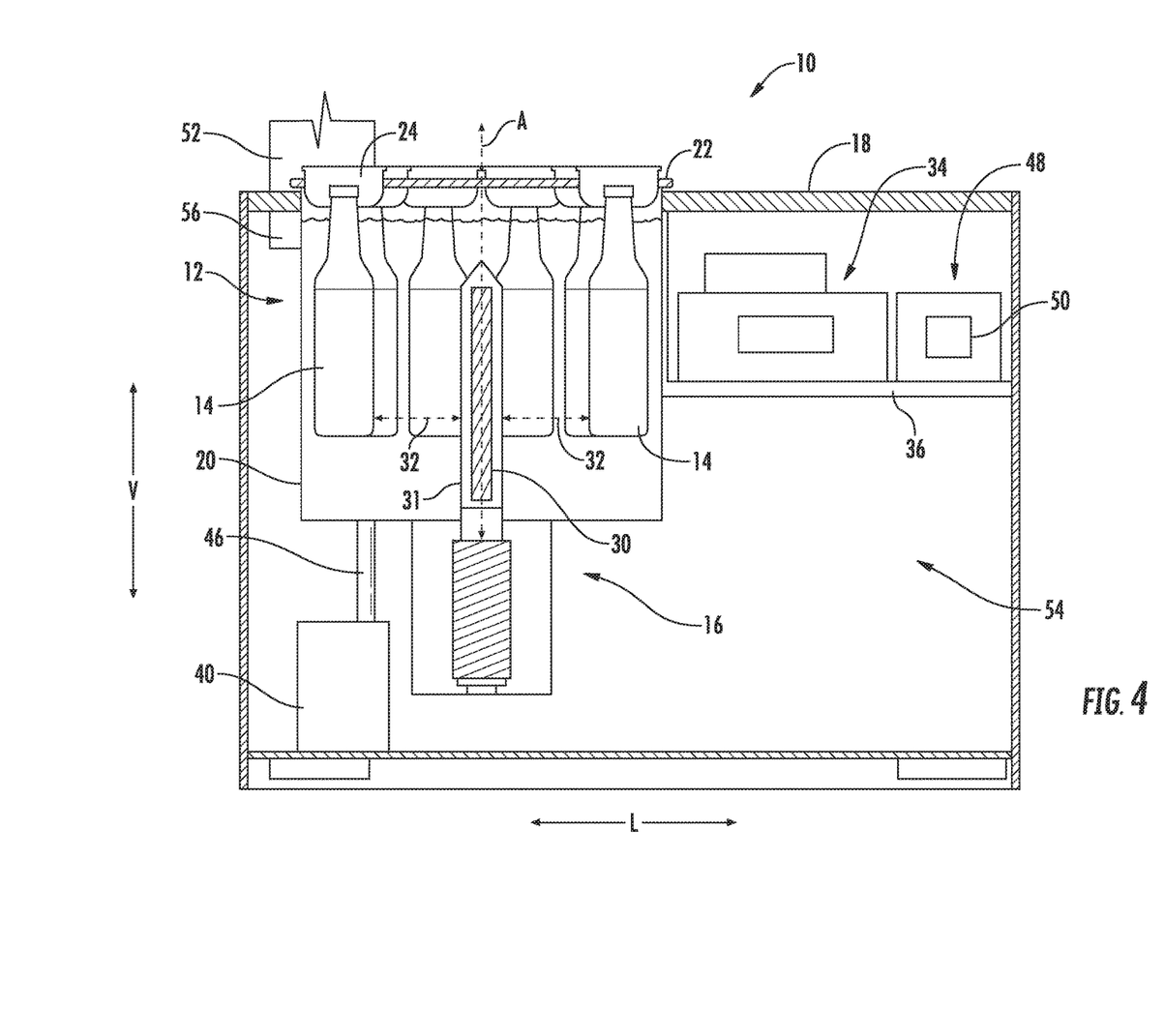
FIG. 4 is a front, cross-sectional view of the exemplary alcohol beverage enhancing device of FIG. 1.

Referring now to the drawings, wherein identical numerals indicate the same elements throughout the figures, FIGS. 1 through 4 depict an alcoholic beverage enhancing device 10 for efficiently enhancing alcoholic beverages. Specifically, FIG. 1 provides a perspective view of an alcoholic beverage enhancing device in accordance with an exemplary embodiment of the present disclosure; FIG. 2 provides a front view of the exemplary alcoholic beverage enhancing device of FIG. 1; FIG. 3 provides a top view of the exemplary alcoholic beverage enhancing device of FIG. 1; and FIG. 4 provides a side, cross-sectional view of the exemplary alcoholic beverage enhancing device of FIG. 1. As used herein, the term "alcoholic beverages" refers generally to any distilled beverage, such as vodka, tequila, rum, whiskey, bourbon, scotch, brandy, and the like.

As is depicted, the enhancing device 10 generally defines a vertical direction V, a lateral direction L, and a transverse direction T, each orthogonal to one another. Additionally, the enhancing device 10 generally includes a transfer liquid tank 12, an alcoholic beverage container 14 positioned at least partially within the transfer liquid tank 12 (or rather a plurality of alcoholic beverage containers 14 for the embodiment depicted; see FIG. 4), and an ultrasonic energy device 16. Broadly speaking, the transfer liquid tank 12 is configured for holding a volume of transfer liquid, and the plurality of alcoholic beverage containers 14 are configured for holding an alcoholic beverage to be enhanced. Each of the plurality of alcoholic beverage containers 14 may include the same alcoholic beverage, or alternatively may include distinct alcoholic beverages. When installed, the alcoholic beverage containers 14 are substantially submerged within the transfer liquid in the transfer liquid tank. Additionally, the ultrasonic energy device 16 is configured for transmitting ultrasonic energy through the transfer liquid in the transfer liquid tank 12 to the alcoholic beverage in the plurality of alcoholic beverage containers 14 during operation of the alcoholic beverage enhancing device 10. As should be appreciated, the application and exposure of ultrasonic energy to the alcoholic beverage within the alcoholic beverage containers 14 may rapidly enhance the alcoholic beverages, improving a quality and taste of such alcoholic beverages. Depending on the alcoholic beverage, the enhancing device 10 may refine, filter, mature, or otherwise enhance the alcoholic beverage. Notably, for the embodiment depicted, the enhancing device 10 further includes a cabinet 18, with the transfer liquid tank 12, ultrasonic energy device 16, and other accessory systems positioned at least partially therein.

The transfer liquid contained within the transfer liquid tank 12 may be any suitable liquid for transferring ultrasonic energy from the ultrasonic energy device 16 to the alcoholic beverage within the alcoholic beverage containers 14. For example, the transfer liquid may be water, a water mixture having one or more additives, a distilled liquid, or any other suitable liquid. During operation of the enhancing device 10, the plurality of alcoholic beverage containers 14 are at least partially submerged in the transfer liquid within the transfer liquid tank 12 and thus are directly exposed to such transfer liquid. Accordingly, ultrasonic energy transmitted through the transfer liquid is provided to each of the plurality of alcoholic beverage containers 14 and the alcoholic beverages contained therein. Notably, the alcoholic beverage containers 14 may be formed of any material suitable for transferring the ultrasonic energy to which it is exposed. For example, in certain embodiments, the alcoholic beverage containers 14 may be formed of a borosilicate glass, a quartz glass, a polycarbonate material, a metal material, or any other suitable material.

In addition to serving the above function of transferring ultrasonic energy, inclusion of the transfer liquid may protect the alcoholic beverage within the alcoholic beverage containers 14 from any degradation of the transfer liquid tank 12 or the ultrasonic energy device 16. More particularly, depending on the materials selected for such components, the material may degrade when liquid and/or ultrasonic energy is exposed thereto. Such a degradation may have an adverse effect on the taste and/or quality of the alcoholic beverage, if such materials were directly exposed to the alcoholic beverage.

Additionally, for the embodiment depicted, the transfer liquid tank 12 defines an axial direction A (FIG. 4) and a generally cylindrical shape along the axial direction A. More particularly, the transfer liquid tank 12 generally includes a body 20 and a lid 22, with the lid 22 defining a circular shape and the body 20 defining a cylindrical shape. Moreover, the lid 22 of the transfer liquid tank 12 includes a plurality of attachment interfaces 24 for attaching the plurality of alcoholic beverage containers 14 to the lid 22 of the transfer liquid tank 12. In certain embodiments, each attachment interface 24 may be separate from the lid 22 and, e.g., rotatably attached to the lid 22. Each of the plurality of alcoholic beverage containers 14 may then be attached to a respective attachment interface 24 in any suitable manner. For example, the alcoholic beverage containers 14 may be rotatably attached to a respective attachment interface 24. For example, in certain exemplary embodiments, the attachment interface 24 may attach to a respective alcoholic beverage container 14 by replacing a cap or lid of the respective alcoholic beverage container 14. However, in other embodiments, the plurality of attachment interfaces 24 may be attached to the lid 22 in any other suitable manner, or alternatively may be formed integrally with or permanently attached to the lid 22. Further, in other exemplary embodiments the attachment interfaces 24 may attach to the alcoholic beverage containers 14 in any other suitable manner. For example, in other embodiments, the attachment interfaces 24 may clamp onto the alcoholic beverage containers 14, or alternatively may define a slot and the alcoholic beverage containers 14 may include a lip for resting on the slot and holding the container 14 in position.

As is also depicted, the enhancing device 10 includes a locking mechanism 26 for locking the lid 22 of the transfer liquid tank 12 to the cabinet 18. The locking mechanism 26 may include a pair of flanges extending from the lid 22 and the cabinet 18, the pair of flanges each defining an opening for receiving a lock 28. Such a configuration may prevent unauthorized persons from operating the enhancing device 10, and depending on the configuration of the lid 22 and attachment interfaces 24, inserting or removing alcoholic beverage containers 14. Additionally, although not depicted, the cabinet 18 may include doors for fully enclosing an interior 54 of the cabinet. As will be discussed, the controls for operating the maturing device 10 may be positioned within the interior 54. Thus, by locking the lid 22 to the cabinet 18 using the locking mechanism 26, and closing and locking the doors to the cabinet 18, the maturing device may be fully enclosed and secure. In other embodiments, any other suitable locking mechanism 26 may be provided, or alternatively no locking mechanism may be provided.

For the embodiment depicted, the enhancing device 10 includes ten alcoholic beverage containers 14 and the lid 22 of the transfer liquid tank 12 includes ten attachment interfaces 24. However, in other exemplary embodiments, the enhancing device 10 may include any other suitable number of alcoholic beverage containers 14. For example, in other exemplary embodiments, the enhancing device 10 may include at least three alcoholic beverage containers 14, at least five alcoholic beverage containers 14, at least eight alcoholic beverage containers 14, or any other suitable number of alcoholic beverage containers 14. Alternatively, in still other embodiments, the enhancing device 10 may only include a single alcoholic beverage container 14 and a single corresponding attachment interface 24.

Each of the alcoholic beverage containers 14 may be approximately the same size. For example, depending on the number of alcoholic beverage containers 14 included, and the size of the transfer liquid tank 12, each of the alcoholic beverage containers 14 may be at least about one half of a liter in size. For example, each of the alcoholic beverage containers 14 may be at least about one liter in size, at least about two liters in size, or at least about three liters in size. For example, in certain embodiments, each of the alcoholic beverage containers 14 may be at least about one gallon in size and up to about two gallons in size. However, in other embodiments, the alcoholic beverage containers 14 may have any other suitable size, and further, in certain embodiments, one or more of the alcoholic beverage containers 14 may define a size that is distinct from one or more of the other alcoholic beverage containers 14.

Moreover, referring specifically to FIG. 3, each of the attachment interfaces 24 of the lid 22 of the transfer liquid tank 12 are substantially evenly spaced along the lid 22 of the transfer liquid tank 12. Specifically, for the embodiment depicted, the transfer liquid tank 12 defines a circumferential direction C extending about the axial direction A, with the plurality of attachment interfaces 24 substantially evenly spaced along the circumferential direction C of the transfer liquid tank 12. As is discussed below, such a configuration may allow for a desirable exposure pattern to the ultrasonic energy device 16.

Referring now particularly to FIG. 4, as stated, the ultrasonic energy device 16 is configured for providing ultrasonic energy through the transfer liquid to the alcoholic beverages in the alcoholic beverage containers 14. Accordingly, the ultrasonic energy device 16 may be any suitable device for generating ultrasonic energy and transmitting such ultrasonic energy to the transfer liquid in the transfer liquid tank 12. The ultrasonic energy device 16 may include one or more speakers and may be positioned within or adjacent to the transfer liquid tank 12. For the embodiment depicted, the ultrasonic energy device 16 includes at least a portion extending at least partially into the transfer liquid tank 12. More particularly, for the embodiment depicted, the ultrasonic energy device 16 includes a case 31 extending through a center of the transfer liquid tank 12 with one or more speakers 30 positioned therein. For example, the one or more speakers 30 may be configured as one or more push-pull speakers, or as a single push-pull speaker extending within the case 31 through the center of the transfer liquid tank 12. However, in other embodiments, the speakers 30 may instead be configured as push speakers or as any other suitable configuration of speakers. For example, in certain embodiments, the speakers 30 may include one or more ultrasonic transducers.

As is depicted, the ultrasonic energy device 16, including the speaker 30, extends most of the way through the transfer liquid tank 12 along the axial direction A of the tank. For example, in the embodiment depicted, the ultrasonic energy device 16 (including the case 31 and speakers 30) extends at least about fifty percent (50%) of the way through the transfer liquid tank 12 along the axial direction A. However, in other embodiments, the ultrasonic energy device 16 may have any other suitable configuration.

With the embodiment depicted, each of the plurality of alcoholic beverage containers 14 may be configured for substantially equal exposure to the ultrasonic energy generated by the ultrasonic energy device 16 during operation. More particularly, for the embodiment depicted such equal exposure to the ultrasonic energy is due to the substantially cylindrical shape of the transfer liquid tank 12, the substantially even spacing of the attachment interfaces 24 along the lid 22 of the transfer liquid tank 12, and the location of the ultrasonic energy device 16. For example, in the embodiment depicted, each alcoholic beverage container 14 defines a separation distance 32 to the ultrasonic energy device 16 (i.e., a minimum distance between the respective alcoholic beverage container 14 and the ultrasonic energy device 16), and the separation distance 32 is substantially the same for each of the plurality of alcoholic beverage containers 14. It should be appreciated, that as used herein, terms of approximation, such as "about" or "substantially," refer to being within a 10% margin of error.

However, in other embodiments, the enhancing device 10 may have any other suitable configuration for exposing the alcoholic beverages within the alcoholic beverage containers 14 to the ultrasonic energy. For example, the ultrasonic energy device 16 may have a plurality of speakers positioned adjacent to or extending at least partially through the transfer liquid tank 12 at one or more locations, with the alcoholic beverage containers 14 and attachment interfaces 24 arranged to receive a substantially equal exposure to the ultrasonic energy. With such an embodiment, the transfer liquid tank 12 may not define a cylindrical shape. Alternatively, in other embodiments, it may be determined that substantially equal exposure to the ultrasonic energy from the ultrasonic energy device 16 is not necessary or even not desired. Accordingly, in such an embodiment, the enhancing device 10 may have any other suitable configuration.

Referring still to the embodiment depicted in FIG. 4, the ultrasonic energy device 16 may be operated to provide a desired amount of ultrasonic energy based on an amount of alcohol contained in the alcoholic beverage containers 14. For example, the plurality of alcoholic beverage containers 14 may together define a total alcoholic beverage volume. During operation of the enhancing device 10, the ultrasonic energy device 16 may be operated to provide a power of at least about three Watts/liter based on the total alcoholic beverage volume during operation of enhancing device 10. However, in other embodiments the ultrasonic energy provided by the ultrasonic energy device 16 can provide any other suitable power level, such as a power level of at least about five Watts/liter, or at least about ten Watts/liter. Moreover, the ultrasonic energy provided by the ultrasonic energy device 16 can provide the ultrasonic energy at a frequency greater than about 20,000 Hz, more specifically between about 20,000 and about 170,000 Hz. For example in one embodiment, the ultrasonic energy can be provided at a frequency greater than about 35,000 Hz. For instance, in one embodiment, the ultrasonic energy can be provided at a frequency of about 80,000 Hz. Of course, in other embodiments, the ultrasonic energy device 16 may provide ultrasonic energy at any other suitable power level or at any other suitable frequency.

Notably, for the embodiment depicted, the enhancing device 10 further includes an amplifier 34 or generator in electrical communication with the ultrasonic energy device 16. For the embodiment depicted, the amplifier 34 is located on a shelf 36 within the cabinet 18 and may be electrically connected to a suitable power source (not shown). It should be appreciated that although the amplifier 34 is positioned on the shelf 36 for the embodiment depicted, in other embodiments the amplifier 34 may instead be positioned at any other suitable location within the cabinet 18, for example mounted directly to the cabinet 18, mounted to a bar (not shown) within the cabinet 18, etc. The amplifier 34 includes a user interface 38 for controlling a power and frequency level of the ultrasonic energy device 16, and as well as for managing other settings relevant to the ultrasonic energy device 16.

Notably, the transmission of ultrasonic energy through the transfer liquid within the transfer liquid device to the alcoholic beverage within the alcoholic beverage containers 14 may increase a temperature of the transfer liquid (as well as a temperature of the alcoholic beverage being enhanced). However, it may be beneficial to maintain a temperature of the alcoholic beverage being enhanced below a certain temperature threshold. For example, in order for the chemical processes to effectively enhance the alcoholic beverages, it may be beneficial to maintain a temperature of the alcoholic beverage being enhanced below approximately 120 degrees Fahrenheit.

Accordingly, in order to maintain a temperature of the transfer liquid and alcoholic beverage within a desired temperature range, the enhancing device 10 further includes a radiator 40 and a fluid pump 42, each of which for the embodiment depicted are located within the cabinet 18 (see FIG. 1). The fluid pump 42 is configured for providing a flow of transfer liquid from the transfer liquid tank 12 through the radiator 40 and back to the transfer liquid tank 12. Accordingly, the enhancing device 10 includes an outlet line 44 extending between and fluidly connecting the transfer liquid tank 12 and the fluid pump 42, as well as an inlet line 46 extending between and fluidly connecting the radiator 40 and the transfer liquid tank 12. During operation, a flow of transfer liquid is generated by the pump 42 from the transfer liquid tank 12, through the outlet line 44, through the pump 42 and radiator 40, and back to the transfer liquid tank 12 through the inlet line 46. Of course, in other embodiments, the flow direction and/or order may be reversed, or alternatively, any other suitable configuration may be utilized.

The radiator 40 is configured for reducing a temperature of the transfer liquid flowing therethrough. Accordingly, in certain embodiments the radiator 40 may include a coil (not shown) through which the transfer liquid flows and fan (not shown) or other device for generating an airflow past the coil to remove heat from the transfer liquid flowing therethrough. However, in other embodiments, the radiator 40 may include a dedicated cooling system, such as a separate, dedicated heat pump system configured to remove heat from the coil through which the transfer liquid flows.

The enhancing device 10 further includes a thermostat 48 operably connected to the pump 42 and/or radiator 40, for controlling a temperature of the transfer liquid in the transfer liquid tank 12. The thermostat 48 may also be electrically connected to a suitable power source (not shown). For example, the thermostat 48 may control an amount of transfer liquid flow through the pump 42 and radiator 40. In such a manner, the thermostat 48 may also control a temperature of the alcoholic beverage in the alcoholic beverage containers 14. For the embodiment depicted, the thermostat 48 may include a user interface 50 for communicating information with a user, such as, a temperature of the transfer liquid or a temperature of the alcoholic beverages in the alcoholic beverage containers 14. Also through the user interface 50, the user may set a desired temperature or desired temperature range for the transfer liquid in the transfer liquid tank 12. The thermostat 48 may include a controller or other processor for automatically operating the pump 42 and/or radiator 40 to maintain the temperature of the transfer liquid in the transfer liquid tank 12 within the set temperature range.

Referring still to FIGS. 1 through 4, the exemplary enhancing device 10 additionally includes a vent 52 in airflow communication with an interior 54 of the cabinet 18. For the embodiment depicted, the vent 52 defines an inlet 55 positioned above the cabinet 18 and extends to the interior 54 of the cabinet 18. The vent 52 is configured for providing an airflow to the interior 54 of the cabinet 18 to create a positive air pressure within the interior 54 of the cabinet 18. More particularly, the vent 52 includes a fan 56 for pulling an airflow through the vent 52 from the inlet 55 at a location above the cabinet 18 along the vertical direction V (i.e., from a safe zone free of alcohol vapors) and providing such airflow to the interior 54 of the cabinet 18. The enhancing device 10 may include a controller or other user interface (not shown), e.g., within the cabinet 18 to operate the fan 56 and the vent 52 during operation of the enhancing device 10. In such a manner, the vent 52 may create a positive pressure within the interior 54 of the cabinet 18 and, e.g., displace any alcohol vapors that may be within the interior 54 of the cabinet 18. Specifically, as will be appreciated, alcohol vapors may be heavier than ambient air vapors, and thus if undisturbed, any alcohol vapors (present due to, e.g., a spill) may settle in the bottom half of the interior 54 of the cabinet 18, potentially creating a fire hazard. Accordingly, inclusion of a vent 52 in accordance with one or more embodiments of the present disclosure may prevent such alcohol vapors from settling in the bottom half of the interior 54 of the cabinet 18.

An alcoholic beverage enhancing device in accordance with one or more embodiments of the present disclosure may allow for relatively rapid enhancing of alcoholic beverages (e.g., refining, filtering, maturing, etc.). Moreover, an alcoholic beverage enhancing device in accordance with one or more embodiments of the present disclosure may provide a compact and contained device for enhancing multiple samples of various alcoholic beverages (i.e., a plurality of distinct alcoholic beverages) simultaneously, or alternatively for enhancing a single alcoholic beverage. Further, the embodiment described herein is configured as a lab-scale unit for performing small batch enhancements of alcoholic beverages. For example, the embodiment described herein may be used for performing small scale enhancements of alcoholic beverages tailored for a specific entity for, e.g., testing, trials, or marketing purposes. Additionally, due to a relatively compact design of the enhancing device depicted, the enhancing device may be installed in a mobile vehicle for relatively easy transport of the ultrasonic energy technology to a variety of locations. However, in other embodiments, the enhancing device may instead be a stationary unit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An alcoholic beverage enhancing device comprising:
   a transfer liquid tank for holding a transfer liquid;
   an alcoholic beverage container positioned at least partially in the transfer liquid tank, the alcoholic beverage container configured for holding an alcoholic beverage to be enhanced; and
   an ultrasonic energy device positioned for transmitting ultrasonic energy to the alcoholic beverage in the alcoholic beverage container through the transfer liquid during operation of the alcoholic beverage enhancing device, the ultrasonic energy device including one or more speakers for producing ultrasonic energy to be transmitted to the alcoholic beverage within the alcoholic beverage container.

2. The alcoholic beverage enhancing device of claim 1, wherein the transfer liquid tank comprises a body and a lid, wherein the lid comprises an attachment interface for attaching the alcoholic beverage container to the lid of the transfer liquid tank.

3. The alcoholic beverage enhancing device of claim 1, wherein the ultrasonic energy device extends at least partially into the transfer liquid tank.

4. The alcoholic beverage enhancing device of claim 1, wherein the transfer liquid tank defines an axial direction, wherein the transfer liquid tank defines a cylindrical shape along the axial direction, and wherein the ultrasonic energy device extends at least partially through the transfer liquid tank along the axial direction.

5. The alcoholic beverage enhancing device of claim 1, wherein the alcoholic beverage enhancing device further comprises a plurality of alcoholic beverage containers.

6. The alcoholic beverage enhancing device of claim 5, wherein each of the plurality of alcoholic beverage containers together define a total alcoholic beverage volume, and wherein the ultrasonic energy device provides a power of at least about three Watts/liter based on the total alcoholic beverage volume during operation of the alcohol beverage enhancing device.

7. The alcoholic beverage enhancing device of claim 5, wherein the plurality of alcoholic beverage containers each define a separation distance to the ultrasonic energy device, and wherein the separation distance is substantially the same for each of the plurality of alcoholic beverage containers.

8. The alcoholic beverage enhancing device of claim 1, wherein the one or more speakers includes one or more push-pull speakers.

9. The alcoholic beverage enhancing device of claim 1, further comprising:
   a radiator; and
   a fluid pump for providing a flow of transfer liquid from the transfer liquid tank through the radiator to maintain a temperature of the transfer liquid within the transfer liquid tank below a desired threshold.

10. The alcoholic beverage enhancing device of claim 1, further comprising:
    a cabinet defining an interior, wherein the transfer liquid tank and ultrasonic energy device are each positioned at least partially in the cabinet; and
    a vent for providing an airflow to the interior of the cabinet.

11. The alcoholic beverage enhancing device of claim 1, further comprising:
    a cabinet, wherein the transfer liquid tank and ultrasonic energy device are each positioned at least partially in the cabinet; and
    a locking mechanism for locking a lid of the transfer liquid tank to the cabinet.

12. An alcoholic beverage enhancing device comprising:
    a transfer liquid tank containing a transfer liquid;
    an alcoholic beverage container positioned at least partially in the transfer liquid tank and directly exposed to the transfer liquid, the alcoholic beverage container holding an alcoholic beverage; and
    an ultrasonic energy device positioned within or adjacent to the transfer liquid tank for transmitting ultrasonic energy through the transfer liquid in the transfer liquid tank to the alcoholic beverage in the alcoholic beverage container during operation of the alcoholic beverage enhancing device;
    wherein the transfer liquid tank comprises a body and a lid, wherein the lid comprises an attachment interface for attaching the alcoholic beverage container to the lid of the transfer liquid tank.

13. The alcoholic beverage enhancing device of claim 12, wherein the ultrasonic energy device extends at least partially into the transfer liquid tank and is directly exposed to the transfer liquid in the transfer liquid tank.

14. The alcoholic beverage enhancing device of claim 12, wherein the alcoholic beverage container is at least partially submerged in the transfer liquid in the transfer liquid tank.

15. The alcoholic beverage enhancing device of claim 12, wherein the alcoholic beverage enhancing device further comprises a plurality of alcoholic beverage containers.

16. The alcoholic beverage enhancing device of claim 15, wherein the plurality of alcoholic beverage containers each define a separation distance to the ultrasonic energy device, and wherein the separation distance is substantially the same for each of the plurality of alcoholic beverage containers.

17. The alcoholic beverage enhancing device of claim 12, wherein the ultrasonic energy device includes one or more speakers for producing ultrasonic energy, and wherein the one or more speakers include one or more linear speakers.

18. The alcoholic beverage enhancing device of claim 12, further comprising:
    a radiator; and
    a fluid pump for providing a flow of transfer liquid from the transfer liquid tank through the radiator to maintain a temperature of the transfer liquid within the transfer liquid tank below a desired threshold.

* * * * *